United States Patent [19]

Nozawa et al.

[11] Patent Number: 4,525,839

[45] Date of Patent: Jun. 25, 1985

[54] METHOD OF CONTROLLING STORAGE DEVICE

[75] Inventors: Masafumi Nozawa, Minami-ashigara; Michio Miyazaki, Odawara, both of Japan

[73] Assignee: Hitachi, Ltd., Tokyo, Japan

[21] Appl. No.: 436,718

[22] Filed: Oct. 26, 1982

[51] Int. Cl.³ ............................................. G06F 11/10
[52] U.S. Cl. .......................................... 371/38; 371/10
[58] Field of Search ...................... 371/10, 38; 360/47, 360/53

[56] References Cited

U.S. PATENT DOCUMENTS

| | | | |
|---|---|---|---|
| 3,222,653 | 12/1965 | Rice | 371/10 |
| 3,560,924 | 2/1971 | McBride | 371/38 |
| 3,619,585 | 11/1971 | Edmondson | 371/10 |
| 3,893,070 | 7/1975 | Bossen et al. | 371/38 |
| 4,308,557 | 12/1981 | Dieterich | 371/38 |

OTHER PUBLICATIONS

Smith et al., Substitute Memory Location Assignment for Faulty Locations, IBM Technical Disclosure Bulletin, vol. 12, No. 5, Feb. 1970, p. 1441.
Smith et al., Substitute Memory Location Locator, IBM Technical Disclosure Bulletin, vol. 12, No. 5, Feb. 1970, p. 1443.

*Primary Examiner*—Jerry Smith
*Assistant Examiner*—M. Ungerman
*Attorney, Agent, or Firm*—Antonelli, Terry & Wands

[57] ABSTRACT

Disclosed is a control method for writing or reading sequentially a plurality of blocks of data for a storage device using a recording medium, such as a photo disk, with a number of recording blocks each having a unique address. In writing data, a plurality of data blocks to be written concurrently are given in their pointer fields the first address indicating the same alternative block, and these data are written in consecutive recording blocks on the recording medium. If blocks with write errors are detected, the data blocks corresponding to the error blocks are written sequentially in an alternative area starting from the first address, after replacing the pointer fields with the second address indicating the defective blocks, respectively. This allows the access of the alternative blocks for defective blocks by detecting the pointer address within the pointer fields of normal blocks preceding and following each of the defective blocks during the data reading operation.

34 Claims, 9 Drawing Figures

METHOD OF CONTROLLING STORAGE DEVICE

The present invention relates to a method of controlling a storage device and, more particularly, to a method of assigning an alternative block to a data block which has caused a write error, the method being particularly suitable for use in a storage device, such as an optical disk unit, of the type where data once recorded on the recording medium can no longer be erased.

Optical disk units are entering into practical application as an economical mass storage device for storing large amounts of data such as picture information. The optical disk is a rotary disk with a metallic film deposited thereon which is to be exposed to a laser beam. When information is recorded, the laser beam is modulated in accordance with the information so as to form "pits" selectively on the metallic film, and when information is retrieved, a weak laser beam is projected concentrically onto the metallic film so that recorded information is picked up by sensing the variation of the reflected beam intensity which depends on the presence or absence of a pit.

For an optical disk unit on which is written a number of blocks (characters) of data sequentially, when a block having a write error is detected by an error checking read operation which is performed following the write operation, it is impossible to correct the error within the same block. Accordingly, the most immediate problem of the optical disk unit is how to overcome the inability to rewrite data in order to correct an error in the data.

In the conventional rewritable storage unit, there have been two major control methods for handling defective blocks. One method is that the timing of writing is delayed and the location of the alternative block is recorded within the defective block by use of a means for avoiding a bad spot. For example, in a fixed-segment magnetic disk, when a defective block is detected by the data check operation following the data writing operation, an alternative block is sought on the alternative track so as to write data thereon and at the same time the location of the alternative block is recorded in the defective block. Another method is that the recording medium is tested in advance for writing and reading, and when a defective block is accessed, it is switched to an alternative block by hardware logics. The latter method has been practiced, for example, in magnetic drum storage units, magnetic bubble memory units and IC memories.

These storage control methods, however, are effective only for rewritable recording media, and they cannot be applied to uncorrectable recording media, such as an optical disk, for recovering write errors.

In order to solve the foregoing problem, it is an object of the present invention to provide a method of controlling a storage device which is suitable for use with uncorrectable recording media, such as an optical disk, particularly a recording medium with a high error rate, to achieve error recovery for defective blocks efficiently.

Another object of the present invention is to provide a method of controlling a recording device which achieves error recovery for defective blocks by efficient use of the recording area.

In order to achieve the above-mentioned object, according to an aspect of the present invention there is provided a method of controlling a storage device using a recording medium with a plurality of recording blocks each having a unique address, the recording medium being divided into a normal recording area which is first accessed in reading or writing data, and an alternative area which includes alternative blocks for storing data in place of defective blocks in the normal recording area, the method comprising a first step of producing sequentially information sets of the first group by combining each of blocks of data to be written on the recording medium with the first pointer information which indicates the address of an alternative block common to the blocks, and a second step of writing sequentially the information sets of the first group into unused consecutive recording blocks within the normal recording area on the recording medium. In the recording control, information sets of the first group which have been written on the recording medium are read out an examined and if a defective block is detected, data corresponding to the defective block is combined with second pointer information which indicates the unique address of the defective block so as to produce information sets of a second group depending on the number of detected defective blocks, and the information sets of the second group are written sequentially into unused recording blocks within the alternative area starting from an alternative block corresponding to the first pointer information. In this way, during the reading operation, when blocks of information sets are read from a given address of the normal recording area on the recording medium, and if a defective block is detected, the alternative area for the defective block can be accessed in accordance with the first pointer in the information set of the normal block adjacent to the defective block.

Other features of the present invention will be apparent from the following detailed description of a preferred embodiment taken in conjunction with the accompanying drawings, in which.

Figure 1:
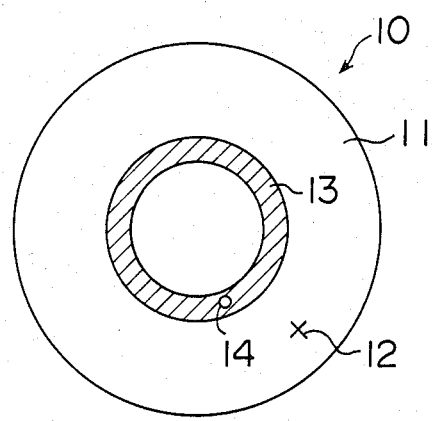
FIG. 1 is a top view of an optical disk, showing the spatial relationship between the data area and the alternative area.

According to the present invention, a recording area 10 of the optical disk is divided into a normal recording area 11 which is first accessed in the reading or writing operation and an alternative area 13, as shown in FIG. 1. Both areas have a plurality of tracks, and each track is divided into a plurality of blocks (i.e., sectors) having individual sector addresses. The size of the alternative area 13 may be determined arbitrarily depending on the error rate of the disk, though in general far less storage capacity is assigned to the alternative area 13 than that to the normal recording area 11.

In writing data in the recording area 11, if a defective sector 12 shown by mark "x" is encountered, the data to be written in this defective sector is recorded in a sector 14 which is selected from the sectors in the alternative area 13. According to the present invention, alternative sectors in the alternative area 13 are used sequentially, and on this account the disk controller maintains address information indicating the sector located next to the alternative sector which has been used last, i.e., the top sector in the unused alternative area. The sector address can be controlled by, for example, initializing a sector address register each time the system is turned on or the photo disk is replaced so that the sector replacement process in the reading operation will start at the first sector in the alternative area 13.

Figure 2:
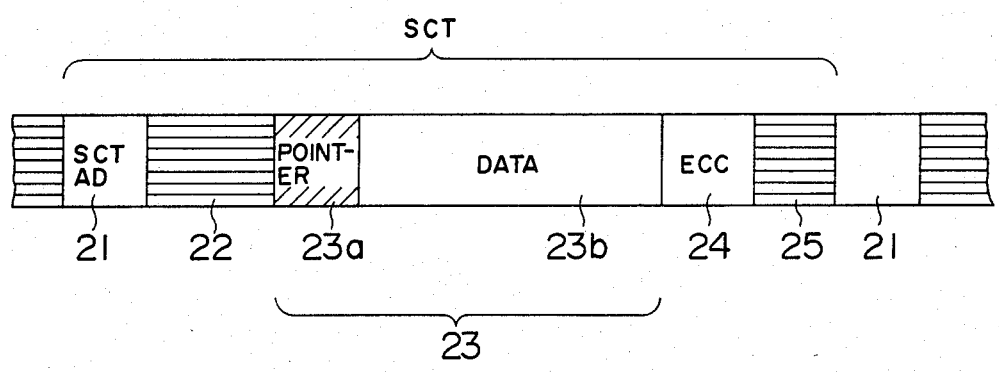
FIG. 2 is an illustration showing the data recording format by application of the present invention.

FIG. 2 shows the format of a unit sector constituting the recording area 11 and alternative area 13. Each sector (SCT) includes a sector address field 21, a gap field 22 preceding a data field, a data field 23, an error correction code (ECC) field 24, and a gap field 25 following the data field. The data field 23 is made up of a pointer section 23a and a pure data section 23b. For sectors in the recording area 11, the pointer section 23a is used as a pointer to an alternative sector, and for sectors in the alternative area 13, the pointer section 23a is used as a pointer to a corresponding defective sector in the recording area 11. According to the present invention, when a higher level device, e.g., a CPU channel, issues a write command for a sector or sectors of data, the disk controller provides for the pointer section 23a of the sector(s) pointer information indicating the common alternative sector address, then operates on a lower level device, e.g., an optical storage controller, to write the data sequentially from the specified sector position in the recording area 11 on the optical disk.

Figure 3:
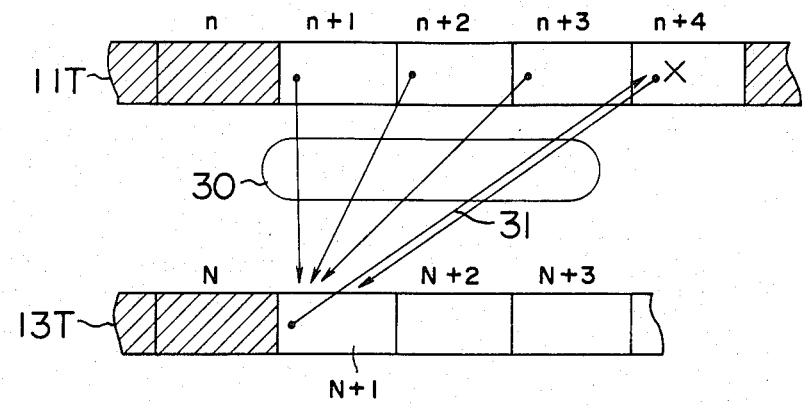
FIG. 3 is an illustration explaining the relationship between the pointer address of each sector within the data area and the pointer address of the alternative sector within the alternative area based on the inventive control method.

FIG. 3 explains the foregoing control method, where reference number 11T denotes part of a track in the recording area 11, including sectors n through n+4, and 13T denotes part of a track in the alternative area 13, including sectors N through N+3. This example shows that sectors up to sector n on track 11T have been used and sectors up to sector N on alternative track 13T have been used. Assuming that four sectors of new data are written starting from sector n+1, address data indicating the same alternative sector N+1, as shown by the arrows 30, is written in the pointer field section 23a of the sectors n+1 through n+4. Further assuming that data in sectors n+1 through n+3 have been determined to be normal, while a read error which is uncorrectable by the ECC has been detected in sector n+4 during the read check following the writing operation, the sector position n+4 is recorded in the pointer section 23a of sector N+1 on the alternative track 13T, as shown by the arrow 31, and data to be written in sector n+4 is recorded in the data section 23b of sector N+1. If the read check for sector N+1 does not detect error, the writing process completes normally. If error occurs in alternative sector N+1, th next sector N+2 to the alternative sector N+1 is assigned to the defective sector n+4 and the same data which was attempted to be written in the sector N+1 is recorded in the sector N+2.

Next, the reading process for the sectors n+1 through n+4 will be described. In this case, sector n+4 causes a read error, but the preceding sector n+3 which has been read normally gives in its pointer section 23a the address N+1 of the alternative sector for these blocks. Accordingly, the alternative track 13T is sought to read out a few sectors following the address N+1, and data in the alternative sector corresponding to the defective sector n+4 can readily be obtained by checking the pointer section of the read-out sectors.

Figure 4:
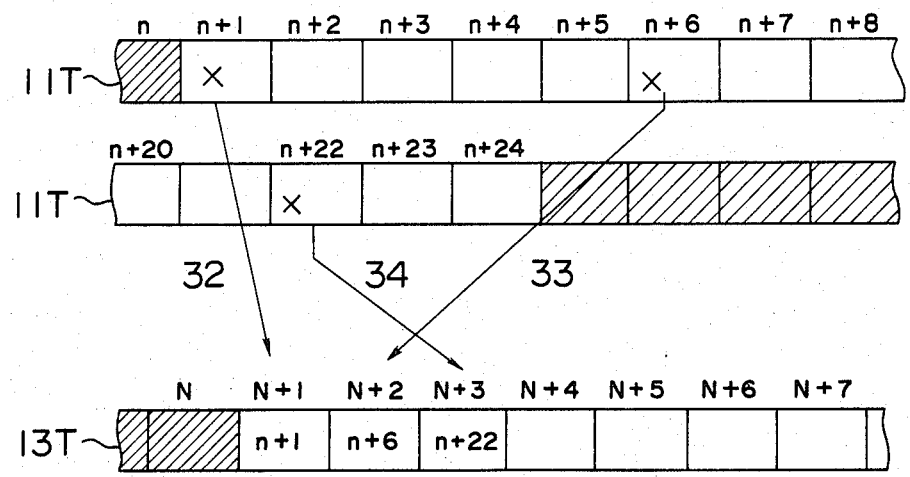
FIG. 4 is an illustration explaining the relationship between the data sector and the alternative sector when errors have occured in a number of data sectors.

Another example of the occurrence of defective sector will be described with reference to FIG. 4. This example shows the occurrence of errors in a number of sectors within the recording area when a large amount of additional data is written. An assumption is made that when 24 sectors of data are additionally written in sectors n+1 through n+24 on track 11T in the data area, errors occur in three sectors n+1, n+6 and n+22. According to the present invention, the disk controller assigns alternative sectors N+1, N+2 and N+3 on alternative track 13T to these defective sectors as shown by the arrows 32, 33 and 34, respectively. In this case, in the pointer section of the sectors n+1 through n+22 on track 11T is written the address indicating sector N+1, and therefore, the pointer address contained in the preceding or following normal sector does not coincide with the respective alternative sector of these defective sectors. However, when the alternative track 13T is read sequentially from the address N+1 indicated by the normal sector to check the pointer section 23a of each sector, it does not take much time to read alternative sectors N+2 and N+3 corresponding to the defective sectors n+6 and n+22.

Figure 5:
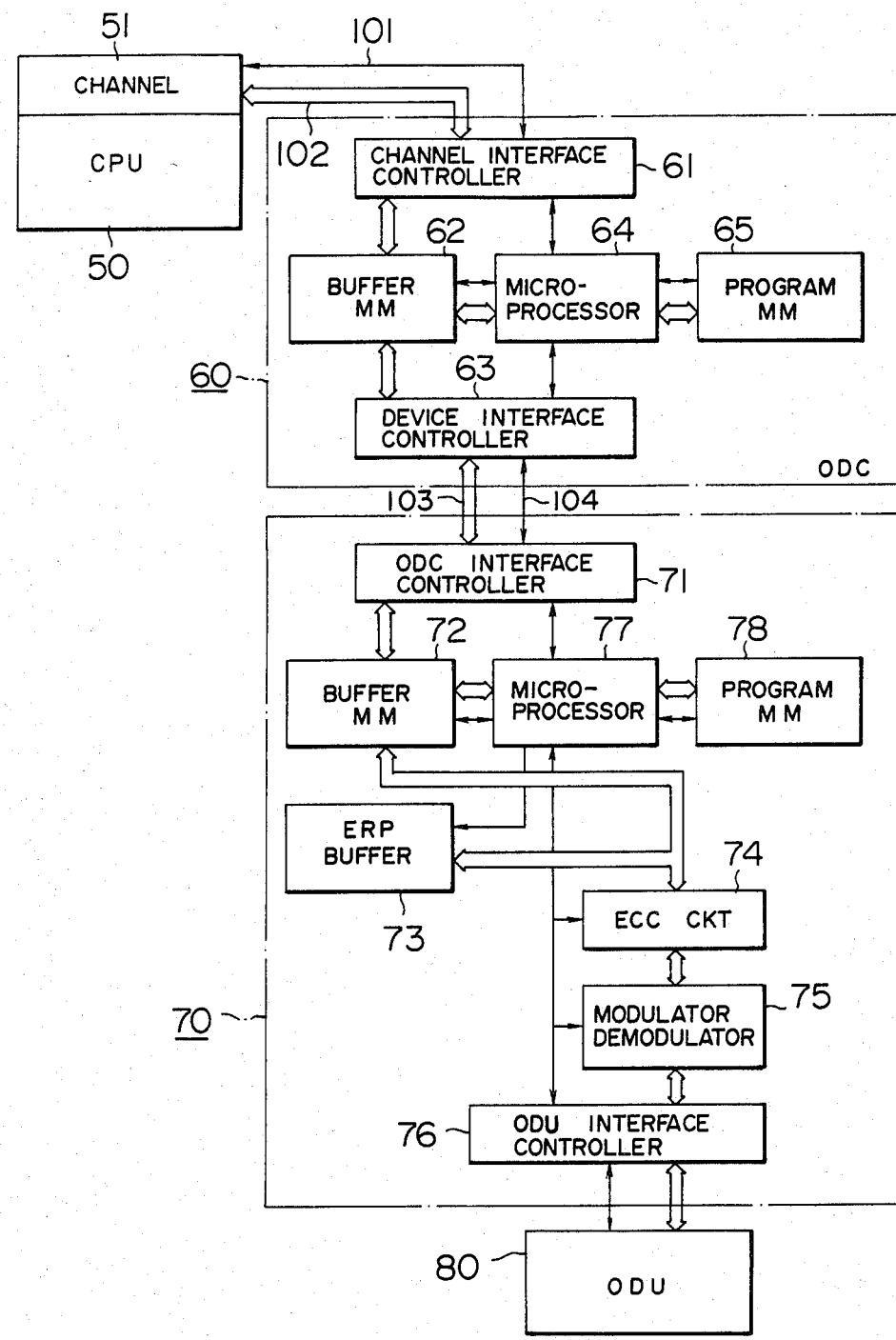
FIG. 5 is a block diagram showing an example of the control system for practicing the inventive control method.

FIG. 5 shows in block diagram the arrangement of the optical disk system which employs the foregoing inventive control method. The arrangement includes a CPU 50, a channel 51, an optical disk controller (ODC) 60, an optical storage controller (OSC) 70, and an optical disk unit (ODU) 80.

The ODC 60 stores the address of the alternative sector to be used next and controls the OSC 70 in response to the write command and read command issued by the channel 51. The ODC 60 includes a channel interface controller 61 which is connected with the channel 51 through a data bus 102 and control lines 101, a buffer memory 62 for holding reception data temporarily, a device interface controller 63 which is connected with the OSC 70 through a data bus 103 and control lines 104, a microprocessor 64 which controls the above-mentioned components, and a memory 65 which stores the program to be executed by the microprocessor 64.

The OSC 70 operates the ODU 80 in response to the commands from the ODC 60, and includes an ODC interface controller 71 which is connected with the data bus 103 and control lines 104, a buffer memory 72 for holding temporarily data which will be written to or has been read out from the recording area 11 of the disk, an error recovery procedure (ERP) buffer 73 for holding data which has been read out from the alternative area 13 of the disk, an ECC circuit 74, a modem circuit 75 which modulates digital data into an analog signal and demodulates an analog signal into digital data, an ODU interface controller 76 connected with the ODU 80, a microprocessor 77 which controls the above-mentioned components, and a memory 78 which stores the program to be executed by the microprocessor 77.

The ODU 80 drives the optical disk and the optical read/write head under control of the OSC 70.

Figure 6:
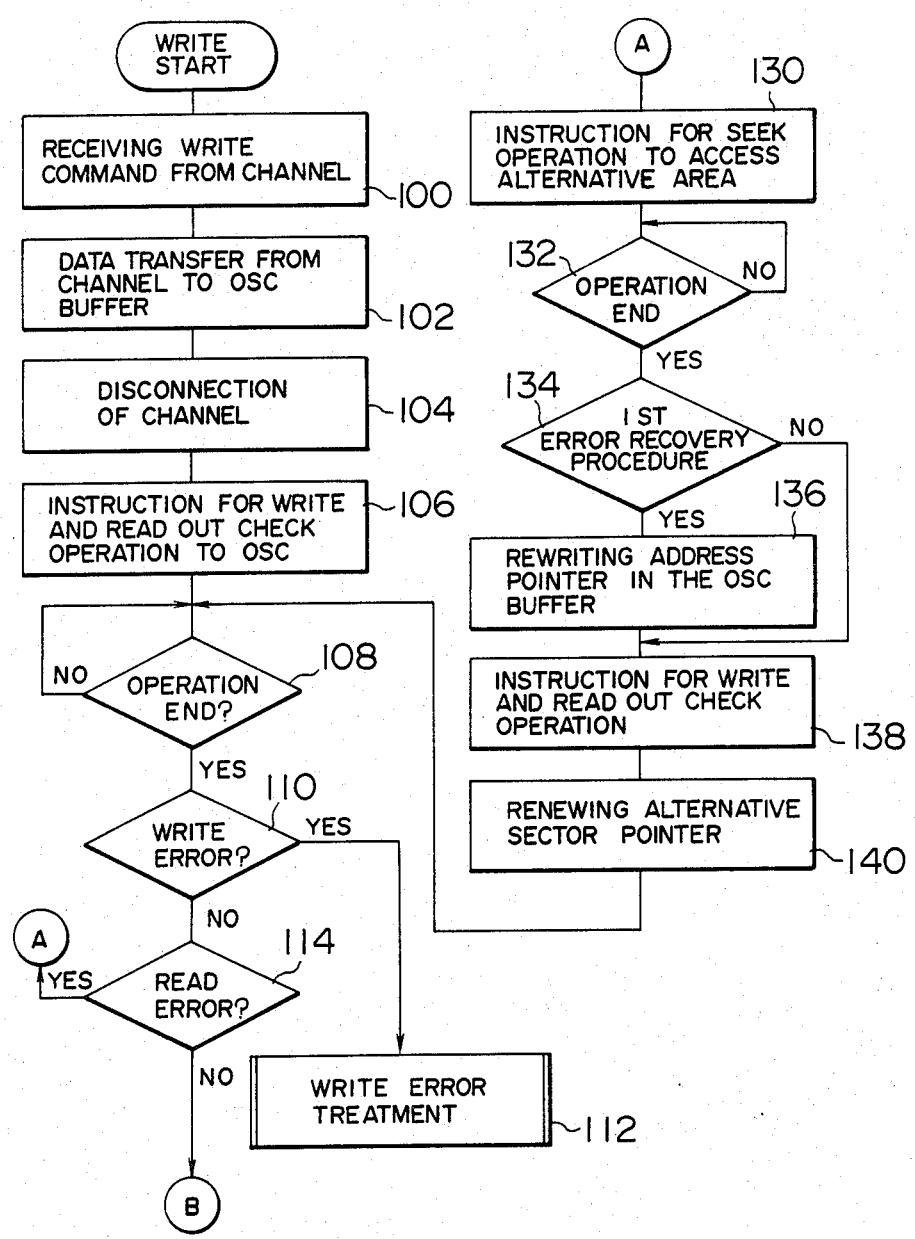
FIGS. 6 and 7 are flowcharts showing in combination the control procedures carried out by the optical disk controller (ODC) 60 shown in FIG. 5 during the writing operation.
Figure 7:
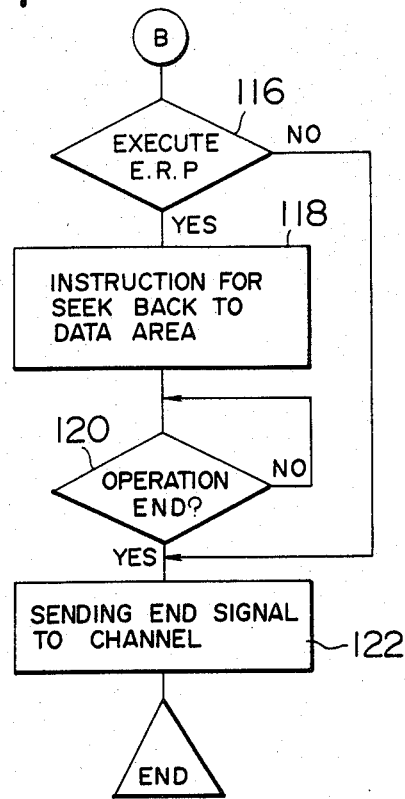
Figure 8:
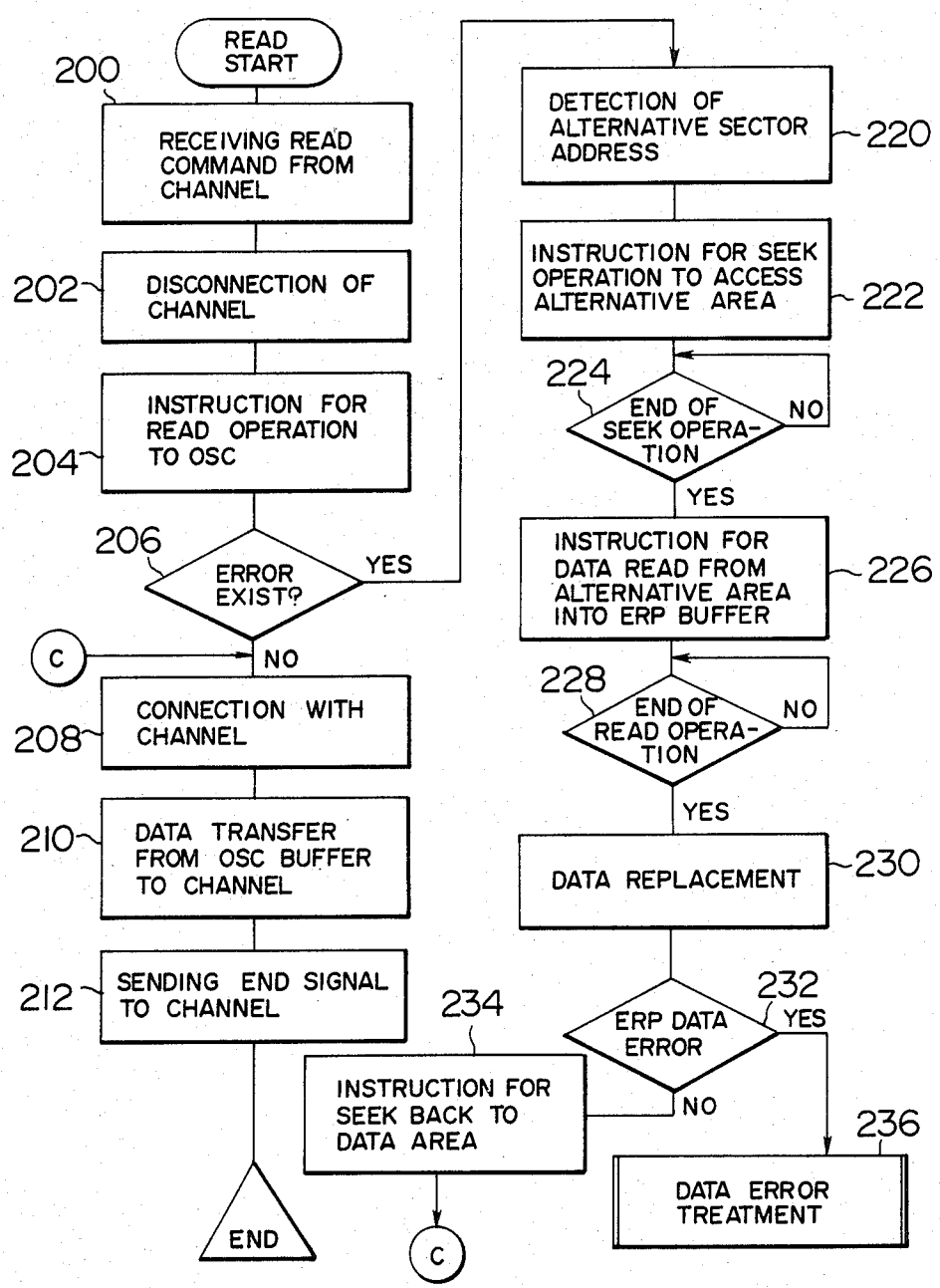
FIG. 8 is a flowchart showing the control procedures carried out by the ODC 60 during the reading operation.

The following will describe with reference to the flowcharts in FIGS. 6, 7 and 8 the control procedures carried out by the microprocessor 64 for accomplishing the inventive control method. The flowchart shown in FIGS. 6 and 7 indicates the control procedures for the data writing process. When the interface controller 61 receives the data write command issued by the channel 51 to the ODC (in routine 100), the microprocessor 64 transfers data of each sector sent from the channel 51 to the buffer memory 72 in the OSC (in routine 102), while appending the common sector pointer (see 23a in FIG. 2) to the data by utilization of the buffer memory 62, and suspends the connection with the channel 51 when the data transfer is completed (in routine 104). Then, the microprocessor 64 issues an instruction to the OSC 70 in order to write data which is held in the buffer memory 72 onto the optical disk starting from the address which has been designated by the CPU separately in advance of the data write command, and thereafter issues the write & read check command (in routine 106).

The microprocessor 64 waits for the operation completion signal of the above-mentioned command from the OSC 70 (in routine 108). During the execution of the above-mentioned command, if the write operation cannot take place due to abnormality in the ODU 80 or the power system, the OSC 70 issues status information indicating a write error together with the operation end signal. In case the write operation has been carried out successfully, if a write error which cannot be corrected by the ECC occurs, the OSC 70 also issues status information indicating this condition. Upon receipt of the operation end signal, the microprocessor 64 analyzes the status information from the OSC 70, and makes the abnormal termination in routine 112 if a write error is detected (in routine 110). If a read error is detected (in routine 114), the error recovery procedure (ERP) routines 130–140 are executed so as to transfer data in the defective sector to the alternative sector.

In routine 130, a seek command is issued to the OSC 70 in order to move the optical disk head located currently in the recording area 11 to the track position indicated by the alternative sector pointer stored in the ODC. The microprocessor 64 waits for the report from the OSC 70 on the completion of the seek operation (in routine 132). On receiving the report, the microprocessor 64 judges whether the current process is the first ERP for the write command from the channel (in routine 134), and if this is true (yes), the microprocessor executes routine 136 so that the contents of the pointer field section 23a (this currently indicates one of the alternative sectors) of each sector data corresponding to the defective sector stored in the buffer memory 72 are changed so as to indicate the defective sector, then the process proceeds to routine 138. If the current process is the second or a later ERP, the routine 136 will be skipped.

In routine 138 the microprocessor 64 issues a command to the OSC 70 so that data of the defective sector stored in the buffer 72, which has been modified in routine 136, is written in the alternative area 13, then the OSC 70 is directed to carry out the read out check. After that, the microprocessor 64 modifies the contents of its alternative sector pointer in accordance with the number of alternative sectors used in the current ERP (i.e., the number of defective sectors which have occurred) (in routine 140), then the process proceeds to routine 108 and waits for the operation completion signal from the OSC.

When the ODU operation is completed without a write error or read error, the process proceeds to the determination routine 116 shown in FIG. 7. If the ERP has not taken place, the process proceeds to routine 122 so as to report the completion of the write operation to the channel 51, and the program is completed. If the ERP has taken place, the seek command is given to the OSC 70 in routine 118 in order to return the optical disk head located currently in the alternative area 13 to the original track position in the recording area 11. Then the microprocessor 64 waits for the report from the OSC on the completion of the seek operation (in routine 120), then proceeds to termination routine 122.

The following will describe, with reference to the flowchart of FIG. 8, the control procedures of the ODC 60 upon receiving the data read command from the channel. When the microprocessor 64 receives the data read command following the commands indicating the address and data length from the channel 51 through the interface 61, (in routine 200), it immediately suspends the connection with the channel (in routine 202), and issues a command to the OSC 70 so that the OSC will store readout data into the OSC buffer 72 (in routine 204). Upon receiving the command, the OSC 70 operates the ODU 80, and issues a report to the ODC 60 when the read operation has completed. If the data has been read normally, the ODC 60 connects with the channel (in routine 208), reads out data in the OSC buffer 72, then transfers the data, with information in the pointer section unnecessary for the CPU being removed, to the channel 51 sequentially (in routine 210). After all data has been transferred, an end signal is issued (in routine 212), and the program is completed. If error is detected in data read out by the ODU 80, routines 220 through 234 are executed in order to read data in the alternative sector. First, in routine 220, the OSC buffer 72 is referenced to know the alternative sector address from the pointer contents provided by the sector which has been read normally. The OSC 70 is given the seek command based on the address for moving the optical disk head to the alternative area (in routine 222). After the seek operation has completed, the ODC directs the OSC 70 to read a plurality of sectors of data, which is much more than the number of defective sectors occurring in the OSC buffer area 72, into the ERP buffer 73 starting from the alternative sector position which has been made known in routine 220 (in routine 226). When the OSC 70 reports the end of the operation (in routine 228) for the above read command, the pointer is checked for alternative sector data which has been read normally in the ERP buffer 73, and data corresponding to the defective sector in the buffer memory 72 is transferred from the ERP buffer 73 to the buffer memory 72 (in routine 230). Next, in routine 232, it is judged whether alternative sector data for all defective sectors in the buffer memory 72 have been replaced by the correct data in the ERP buffer 73, and if this is true, the process proceeds to routine 234 to issue the command for returning the optical disk head to the data area, then the process proceeds to routine 208. If a defective sector disabling data relocation has been detected in routine 232, that means an abnormality appears in the alternative area on the optical disk, the abnormality processing routine 236 will be executed.

Figure 9:
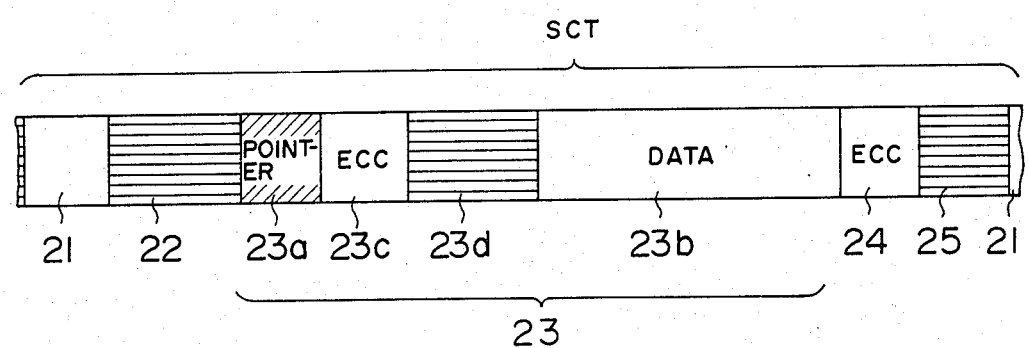
FIG. 9 is an illustration of the data recording format without application of the present invention, useful to explain the effect of the present invention.

The following will describe the effect of the present invention, making reference to the data format shown in FIG. 9 without application of the present invention. The data format of FIG. 9 is to write the address of a specific alternative sector corresponding to a defective sector into the pointer section 23a of the defective sector within the recording area 11. In this case, the ECC 24 corresponding to the data section 23b is appended during the first writing operation, and the alternative sector address is written in the pointer section 23a during the second writing operation following the determination of the defective sector as a result of the data check. Therefore, in order to make the pointer contents reliable, the pointer section 23a needs to be associated with the specific ECC 23c, and it is also necessary to provide a gap 23d between the ECC 23c and the data 23b.

According to the present invention, as can be seen from FIG. 2, since the pointer section 23a and data section 23b can be written concurrently, it is sufficient to provide a common ECC field 24, and the area used for the ECC 23c and gap 23d in FIG. 9 can be saved. Thus the recording medium can have a larger storage capacity.

Moreover, in the case of the data format shown in FIG. 9, if error occurs in the recording of the alternative sector address into the pointer section 23a of the defective sector, it is a problem how to recognize the alternative sector of that defective sector, and presumably the control procedures will become much more complicated in order to solve this problem. In this respect, according to the present invention, all normal sectors preceding and following the defective sector have address information in their pointer section 23a, making it possible to know the alternative sector even if the pointer within the defective sector cannot be read.

The following is a second example of a control method without application of the present invention, wherein the pointer to the alternative sector is not provided at all, and the entire alternative sector area which has been determined in advance is searched. In this case, search time for the alternative sector is not negligible, and the overhead for a recording medium with a high error rate will become a large problem. Although elimination of the pointer section in each sector provides a larger effective storage capacity for the recording medium as compared with the method of the present invention, the processing ability is disadvantageously low due to the overhead.

According to the present invention, as described above, the location of the alternative block is recorded in the normal blocks located before and after the defective block, and error recovery for a defective sector can be achieved efficiently for a storage device using a nonrewritable recording medium, such as an optical disk, with a high error rate.

Although in the foregoing embodiment, the sector of the optical disk has been described as a data block, it will be appreciated that the inventive control method can also be applied to a recording system where the track of data is processed as a block.

We claim:

1. A method of controlling a storage device using a recording medium with a plurality of recording blocks each having a unique address, said recording medium being divided into a normal recording area which is first accessed in an operation of reading or writing data, and an alternative area having alternative blocks for storing data in place of defective blocks in said normal recording area, said method comprising:

a first step of producing sequentially information sets of a first group by combining each of a plurality of blocks of data to be written on said recording medium concurrently with a first pointer information indicating the address of an alternative block which is common to said plurality of blocks; and a second step of writing sequentially said information sets of the first group into unused contiguous recording blocks within said normal recording area on said recording medium.

2. A method of controlling a storage device according to claim 1 further comprising:

a third step of detecting defective recording blocks in said information sets of the first group which have been written on said recording medium;

a fourth step of producing, if a defective block has been detected, information sets of the second group depending on the number of detected defective blocks by combining data corresponding to the defective blocks with a second pointer information indicating the individual addresses of said defective blocks; and a fifth step of writing sequentially said information sets of the second group into unused recording blocks within said alternative area starting from an alternative block corresponding to said first pointer information.

3. A method of controlling a storage device according to claim 2 further comprising:

a sixth step of detecting defective recording blocks in said information sets of the second group in said alternative area on said recording medium; and a step of writing, if a defective block has been detected, information sets corresponding to said defective blocks into alternative blocks following the recording block of said information sets of the second group within said alternative area.

4. A method of controlling a storage device according to claim 3 further comprising a step of appending an error check code inclusive of the first pointer information and said data block to each information set to be written in each recording block on said recording medium.

5. A method of controlling a storage device according to claim 2 further comprising a step of appending an error check code inclusive of the first pointer information and said data block to each information set to be written in each recording block on said recording medium.

6. A method of controlling a storage device according to claim 1 further comprising a step of appending an error check code inclusive of the first pointer information and said data block to each information set to be written in each recording block on said recording medium.

7. A method of controlling a storage device to record on a recording medium a plurality of recording blocks each having a unique address, said recording medium being divided into a normal recording area which is first accessed in operations of reading and writing data, and an alternative area having alternative blocks for storing data in place of defective blocks in said normal recording area, said method comprising:

a data writing step including, sequentially recording information sets of a first group formed by combining each of a plurality of blocks of data to be written on said recording medium with a first pointer indicating the address of an alternative block which is common to said blocks in said normal recording area on said recording medium in response to a write command issued by a higher level system, detecting write errors in the recorded information sets, and then writing information sets formed with the combination of data corresponding to information sets which have caused write errors with a second pointer indicating the individual addresses of defective blocks in unused recording blocks within said alternative area starting from the alternative block indicated by the first pointer; and a data reading step including, reading a plurality of blocks of information sets from specified addresses in said normal recording area on said recording medium in response to a read command issued by said higher level system, analyzing the read data to detect defective blocks, and then, if a defective block is detected, accessing said alternative area on said recording medium in accordance with the contents of said first pointer included in information sets of normal blocks adjacent to each of said defective blocks.

8. A method of controlling a storage device according to claim 7, wherein said alternative area accessing step comprises a step of reading a plurality of blocks of information sets starting from an alternative block indicated by said first pointer within said alternative area on said recording medium, and a step of determining an alternative block for said defective block within said normal recording area basing on the contents of pointers included in said read-out information sets.

9. A method of controlling a storage device according to claim 8, wherein said data reading step comprises a step of replacing a normal block data read out from said normal recording area on said recording medium with an alternative block data corresponding to said defective block within said normal recording area, and transferring said replaced data to said higher level system.

10. A method of writing data for a storage device using an uncorrectable recording medium with a plurality of recording blocks each having a unique address, said recording medium being divided into a normal recording area which is first accessed in a reading or writing operation for data, and an alternative area having alternative blocks for storing data in place of defective blocks in said normal recording area, said method comprising:

a first step of producing sequentially information sets of a first group by combining each of a plurality of blocks of data to be written on said recording medium concurrently with a first pointer information indicating the address of an alternative block which is common to said plurality of blocks; and a second step of writing sequentially said information sets of the first group into unused contiguous recording blocks within said normal recording area on said recording medium.

11. A method of writing data for a storage device according to claim 10 further comprising:

a third step of detecting defective recording blocks in said information sets of the first group which have been written on said recording medium;

a fourth step of producing, if a defective block has been detected, information sets of the second group depending on the number of detected defective blocks by combining data corresponding to the defective blocks with a second pointer information indicating the individual addresses of said defective blocks; and a fifth step of writing sequentially said information sets of the second group into unused recording blocks within said alternative area starting from an alternative block corresponding to said first pointer information.

12. A method of writing data for a storage device according to claim 11 further comprising:

a sixth step of detecting defective recording blocks in said information sets of the second group in said alternative area on said recording medium; and a step of writing, if a defective block has been detected, information sets corresponding to said defective blocks into alternative blocks following the recording block of said information sets of the second group within said alternative area.

13. A method of writing data for a storage device according to claim 12 further comprising a step of appending an error check code inclusive of the first pointer information and said data block to each information set to be written in each recording block on said recording medium.

14. A method of writing data for a storage device according to claim 11 further comprising a step of appending an error check code inclusive of the first pointer information and said data block to each information set to be written in each recording block on said recording medium.

15. A method of writing data for a storage device according to claim 10 further comprising a step of appending an error check code inclusive of the first pointer information and said data block to each information set to be written in each recording block on said recording medium.

16. A method of reading and writing data for a storage device using an uncorrectable recording medium with a plurality of recording blocks each having a unique address, said recording medium being divided into a normal recording area which is first accessed in operations of reading and writing data, and an alternative area having alternative blocks for storing data in place of defective blocks in said normal recording area, said method comprising:

a data writing step including, sequentially recording information sets of a first group formed by combining each of a plurlity of blocks of data to be written on said recording medium with a first pointer indicating the address of an alternative block which is common to said blocks in said normal recording area on said recording medium in response to a write command issued by a higher system, detecting errors in the recorded information sets, and then writing information sets formed with the combination of data corresponding to information sets which have caused write errors with a second pointer indicating the individual addresses of defective blocks in unused recording blocks within said alternative area starting from the alternative block indicated by the first pointer; and a data reading step including, reading a plurality of blocks of information sets from specified addresses in said normal recording area on said recording medium in response to a read command issued by said higher level system, analyzing the read data to detect defective blocks, and then, if a defective block is detected, accessing said alternative area on said recording medium in accordance with the contents of said first pointer included in information sets of normal blocks adjacent to each of said defective blocks.

17. A method of reading and writing data for a storage device according to claim 16, wherein said alternative area accessing step comprises a step of reading a plurality of blocks of information sets starting from an alternative block indicated by said first pointer within said alternative area on said recording medium, and a step of determining an alternative block for said defective block within said normal recording area basing on the contents of pointers included in said read-out information sets.

18. A method of reading and writing data for a storage device according to claim 17, wherein said data reading step comprises a step of replacing a normal block of data read out from said normal recording area on said recording medium with an alternative block data corresponding to said defective block within said normal recording area, and transferring said replaced data to said higher level system.

19. A method of controlling a storage device using a recording medium with a plurality of recording blocks each having a unique address, said recording medium being divided into a normal recording area which is first accessed in operations of reading and writing data, and an alternative area having alternative blocks for storing data in place of defective blocks in said normal recording area, said method comprising the steps of:
storing a first pointer information indicating the address of an available alternative block in said alternative area;
combining said first pointer information with each of a plurality of data blocks to be written concurrently on said recording medium thereby to produce information sets of a first group;
writing sequentially said information sets of the first group into unused contiguous recording blocks within said normal recording area on said recording medium;
reading said information sets of the first group which have been written on said recording medium;
checking said information sets of the first group read from said recording medium to detect defective recording blocks;
combining, if a defective block has been detected, each data block corresponding to the defective block with a second pointer information indicating the individual address of said defective recording block thereby to produce information sets of the second group depending on the number of detected defective blocks; and
writing sequentially said information sets of the second group into unused recording blocks within said alternative area starting from an alternative block corresponding to said first pointer information.

20. A method of controlling a storage device according to claim 19, further comprising the steps of:
reading said information sets of the second group which have been written on said recording medium;
checking said information sets of the second group read from the recording medium to detect defective recording blocks; and
writing, if a defective block has been detected, information sets corresponding to said defective blocks into alternative blocks following the recording block of said information sets of the second group previously written within said alternative area.

21. A method of controlling a storage device according to claim 20, further comprising a step of appending an error check code inclusive of the first pointer information and said data block to each information set to be written in each recording block on said recording medium.

22. A method of controlling a storage device according to claim 21, further comprising a step of appending an error check code inclusive of the second pointer information and said data block to each information set of said second group to be written in each recording block on said recording medium.

23. A method of controlling a storage device according to claim 19, further comprising a step of appending an error check code inclusive of the first pointer information and said data block to each information set to be written in each recording block on said recording medium.

24. A method of controlling a storage device according to claim 19, further comprising:
in response to a read command issued by a higher level system reading sequentially a plurality of information sets from said normal recording area on said recording medium starting from a specified address;
checking said information sets read from said recording medium to detect a defective block;
selecting, if a defective block has been detected in said checking step, a first pointer information within the read-out information sets of normal blocks neighboring to said defective block;
accessing said alternative area on said recording medium based on said selected first pointer to read an alternative block corresponding to said defective block.

25. A method of controlling a storage device according to claim 24, wherein said alternative area accessing step comprises a step of reading a plurality of blocks of information sets starting from an alternative block indicated by said first pointer within said alternative area on said recording medium, and a step of determining an alternative block for said defective block within said normal recording area based on the contents of pointers included in said read-out information sets.

26. A method of controlling a storage device according to claim 25, further comprising a step of transferring read-out data blocks to said higher level system, by replacing the contents of the defective block read out from said normal recording area with the contents of said alternative block having a second pointer corresponding to said defective block.

27. An apparatus for controlling a storage device using an uncorrectable recording medium with a plurality of recording blocks each having a unique address, said recording medium being divided into a normal recording area which is first accessed in a reading or writing operation for data, and an alternative area having alternative blocks for storing data in place of defective blocks in said normal recording area, comprising:
first means for combining first pointer information indicating the address of an available alternative block in said alternative area with each of a plurality of data blocks to be written concurrently on said recording medium thereby to produce information sets of a first group;

means for writing sequentially said information sets of the first group into unused contiguous recording blocks within said normal recording area on said recording medium;

means for reading said information sets of the first group which have been written on said recording medium;

means for checking said information sets of the first group read from said recording medium to detect defective recording blocks;

second means for combining, if a defective block has been detected, each data block corresponding to the defective block with a second pointer information indicating the individual address of said defective recording block thereby to produce information sets of the second group depending on the number of detected defective blocks; and means for writing sequentially said information sets of the second group into unused recording blocks within said alternative area starting from an alternative block corresponding to said first pointer information.

28. An apparatus for controlling a storage device according to claim 27, further comprising:

means for reading said information sets of the second group which have been written on said recording medium;

means for checking said information sets of the second group read from the recording medium to detect defective recording blocks; and means for writing, if a defective block has been detected, information sets corresponding to said defective blocks into alternative blocks following the recording block of said information sets of the second group previously written within said alternative area.

29. An apparatus for controlling a storage device according to claim 28, wherein said first combining means includes means for appending an error check code inclusive of the first pointer information and said data block to each information set to be written in each recording block on said recording medium.

30. An apparatus for controlling a storage device according to claim 29, wherein said second combining means includes means for appending an error check code inclusive of the second pointer information and said data block to each information set of said second group to be written in each recording block on said recording medium.

31. An apparatus for controlling a storage device according to claim 27, wherein said first combining means includes means for appending an error check code inclusive of the first pointer information and said data block to each information set to be written in each recording block on said recording medium.

32. An apparatus for controlling a storage device according to claim 27, further comprising:

means responsive to a read command issued by a higher level system, for sequentially reading a plurality of information sets from said normal recording area on said recording medium starting from a specified address;

means for checking said information sets read from said recording medium to detect a defective block;

means for selecting, if a defective block has been detected in said checking step, a first pointer information within the read-out information sets of normal bolcks neighboring to said defective block; and means for accessing said alternative area on said recording medium based on said selected first pointer to read an alternative block corresponding to said defective block.

33. An apparatus for controlling a storage device according to claim 32, wherein said means for accessing said alternative area comprises means for reading a plurality of blocks of information sets starting from an alternative block indicated by said first pointer within said alternative area on said recording medium, and means for determining an alternative block for said defective block within said normal recording area based on the contents of pointers included in said read-out information sets.

34. An appratus for controlling a storage device according to claim 33, further comprising means for transferring read-out data blocks to said higher level system by replacing the contents of the defective block read out from said normal recording area with the contents of said alternative block having a second pointer corresponding to said defective block.

* * * * *

UNITED STATES PATENT AND TRADEMARK OFFICE
CERTIFICATE OF CORRECTION

PATENT NO.　: 4,525,839
DATED　　　: June 25, 1985
INVENTOR(S): M. Nozawa et al

It is certified that error appears in the above—identified patent and that said Letters Patent is hereby corrected as shown below:

On the title page, insert:

-- Foreign Application Priority Date

October 30, 1981        Japan        173860 --.

Signed and Sealed this

Twenty-sixth Day of November 1985

[SEAL]

Attest:

Attesting Officer

DONALD J. QUIGG

Commissioner of Patents and Trademarks